United States Patent
Hsu et al.

(10) Patent No.: US 12,262,431 B2
(45) Date of Patent: Mar. 25, 2025

(54) WI-FI MULTI-LINK DEVICE FOR INDICATING CAPABILITIES OF AFFILIATED STATIONS FOR DIFFERENT ENABLED LINK COMBINATIONS DURING ASSOCIATION AND RELATED CAPABILITY INDICATION METHOD

(71) Applicant: MEDIATEK INC., Hsin-Chu (TW)

(72) Inventors: Chien-Fang Hsu, Hsinchu (TW); Yongho Seok, San Jose, CA (US); James Chih-Shi Yee, San Jose, CA (US)

(73) Assignee: MEDIATEK INC., Hsinchu (TW)

( * ) Notice: Subject to any disclaimer, the term of this patent is extended or adjusted under 35 U.S.C. 154(b) by 237 days.

(21) Appl. No.: 17/724,483

(22) Filed: Apr. 19, 2022

(65) Prior Publication Data

US 2022/0346165 A1 Oct. 27, 2022

Related U.S. Application Data

(60) Provisional application No. 63/178,642, filed on Apr. 23, 2021.

(51) Int. Cl.
*H04W 76/15* (2018.01)
*H04W 72/51* (2023.01)
*H04W 88/06* (2009.01)

(52) U.S. Cl.
CPC ........... *H04W 76/15* (2018.02); *H04W 72/51* (2023.01); *H04W 88/06* (2013.01)

(58) Field of Classification Search
CPC . H04W 8/24; H04W 74/002; H04W 72/0453; H04W 36/0079; H04W 76/15
See application file for complete search history.

(56) References Cited

U.S. PATENT DOCUMENTS 11,240,716 B2 * 2/2022 Nam ................. H04W 36/0079
2019/0124526 A1 4/2019 Park
(Continued)

FOREIGN PATENT DOCUMENTS

| CN | 108353422 A * | 7/2018 | ........ H04W 72/0413 |
| CN | 115243373 A * | 10/2022 | .......... H04W 72/048 |
| DE | 102022109661 A1 * | 10/2022 | .......... H04W 72/048 |

OTHER PUBLICATIONS

C. Chen, X. Chen, D. Das, D. Akhmetov and C. Cordeiro, "Overview and Performance Evaluation of Wi-Fi 7," in IEEE Communications Standards Magazine, vol. 6, No. 2, pp. 12-18, Jun. 2022, doi: 10.1109/MCOMSTD.0001.2100082. (Year: 2022).*

*Primary Examiner* — William D Cumming
(74) *Attorney, Agent, or Firm* — Winston Hsu

(57) ABSTRACT

During association between an access point (AP) multi-link device (MLD) and a non-AP MLD, the non-AP MLD indicates a first capability allocation of a first combination of affiliated stations for a first combination of enabled links on the non-AP MLD, and indicates a second capability allocation of a second combination of affiliated stations for a second combination of enabled links on the non-AP MLD. For example, the first combination of affiliated stations and the second combination of affiliated stations have different numbers of stations in the non-AP MLD, and the first combination of enabled links and the second combination of enabled links have different numbers of enabled links. Hence, during the association between the non-AP MLD and the AP MLD, capabilities of different non-AP station combinations corresponding to different enabled link combinations supported by the non-AP MLD are signaled to the AP MLD.

20 Claims, 5 Drawing Sheets

(56) References Cited

U.S. PATENT DOCUMENTS

| | | | | |
|---|---|---|---|---|
| 2021/0045175 | A1 | 2/2021 | Huang | |
| 2021/0084549 | A1* | 3/2021 | Nam | H04W 8/24 |
| 2021/0329500 | A1* | 10/2021 | Cariou | H04W 74/002 |
| 2021/0329637 | A1* | 10/2021 | Chen | H04W 72/0453 |
| 2022/0124856 | A1* | 4/2022 | Patil | H04W 76/15 |
| 2022/0346165 | A1* | 10/2022 | Hsu | H04W 8/24 |
| 2024/0064633 | A1* | 2/2024 | Ajami | H04L 27/2602 |

* cited by examiner

WI-FI MULTI-LINK DEVICE FOR INDICATING CAPABILITIES OF AFFILIATED STATIONS FOR DIFFERENT ENABLED LINK COMBINATIONS DURING ASSOCIATION AND RELATED CAPABILITY INDICATION METHOD

CROSS REFERENCE TO RELATED APPLICATIONS

This application claims the benefit of U.S. Provisional Application No. 63/178,642, filed on Apr. 23, 2021. The content of the application is incorporated herein by reference.

BACKGROUND

The present invention relates to wireless communications, and more particularly, to a Wi-Fi multi-link device (MLD) for indicating capabilities of affiliated stations for different enabled link combinations during association and a related capability indication method.

In a Wi-Fi multi-link operation (MLO), there may exist several links between two MLDs, including one access point (AP) MLD and one non-AP MLD. These links can operate independently to increase the overall throughput and/or to improve the connection stability. An AP MLD may be regarded as having multiple APs affiliated to the same MLD. A non-AP MLD may be regarded as having multiple non-AP stations (STAs) affiliated to the same MLD. The APs or STAs in the same MLD may share some resources, such as memories, antennas, and/or radios. In addition, the MLD can manage the allocation of such resources. If a peer MLD (e.g. AP MLD) is informed of the capabilities of affiliated stations (e.g. non-AP STAs) for enabled links on an MLD (e.g. non-AP MLD), the peer MLD (e.g. AP MLD) can utilize these capabilities to maximize the channel utilization or throughput to the MLD (e.g. non-AP MLD). Thus, there is need for an innovative capability indication design which is capable of signaling capabilities of affiliated stations (e.g. non-AP STAs) for different enabled link combinations supported by an MLD (e.g. non-AP MLD) to a peer MLD (e.g. AP MLD).

SUMMARY

One of the objectives of the claimed invention is to provide a Wi-Fi multi-link device (MLD) for indicating capabilities of affiliated stations (e.g. non-AP STAs) for different enabled link combinations during association and a related capability indication method.

According to a first aspect of the present invention, an exemplary capability indication method employed by a Wi-Fi multi-link device (MLD) is disclosed. The exemplary capability indication method includes: during an association process between the Wi-Fi MLD and another Wi-Fi MLD, indicating a first capability allocation of a first combination of affiliated stations in the Wi-Fi device for a first combination of enabled links on the Wi-Fi MLD, and indicating a second capability allocation of a second combination of affiliated stations in the Wi-Fi device for a second combination of enabled links on the Wi-Fi MLD, wherein the first combination of affiliated stations is different from the second combination of affiliated stations, and the first combination of enabled links is different from the second combination of enabled links.

According to a second aspect of the present invention, an exemplary Wi-Fi multi-link device (MLD) is disclosed. The exemplary Wi-Fi MLD includes a network interface circuit and a control circuit. The control circuit is arranged to deal with an association process between the Wi-Fi MLD and another Wi-Fi MLD through the network interface circuit, wherein during the association process, the control circuit indicates a first capability allocation of a first combination of affiliated stations in the Wi-Fi device for a first combination of enabled links on the Wi-Fi MLD, and further indicates a second capability allocation of a second combination of affiliated stations in the Wi-Fi device for a second combination of enabled links on the Wi-Fi MLD, where the first combination of affiliated stations is different from the second combination of affiliated stations, and the first combination of enabled links is different from the second combination of enabled links.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
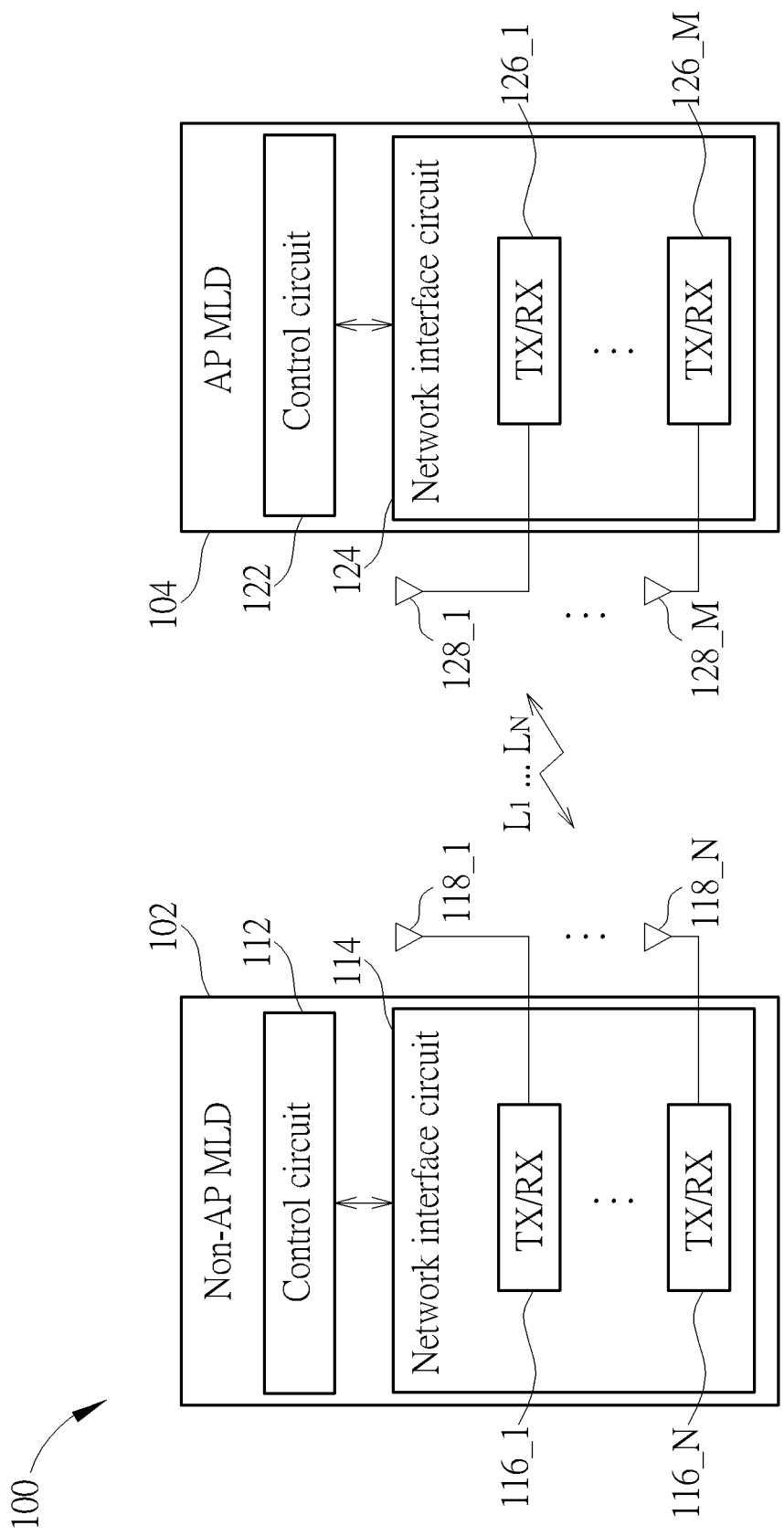
FIG. 1 is a diagram illustrating a Wi-Fi system according to an embodiment of the present invention.

FIG. 1 is a diagram illustrating a Wi-Fi system according to an embodiment of the present invention. The Wi-Fi system 100 has a plurality of wireless communication devices, including an access point (AP) multi-link device (MLD) 104 and a non-AP MLD 102, where the AP MLD 104 may be regarded as having multiple APs affiliated to the same MLD, and the non-AP MLD 102 may be regarded as having multiple non-AP stations (STAs) affiliated to the same MLD. More specifically, each of the AP MLD 104 and the non-AP MLD 102 may include a plurality of stations, where each station affiliated to the same AP MLD is an AP, and each station affiliated to the same non-AP MLD is a non-AP STA. For brevity and simplicity, only two wireless communication devices are shown in FIG. 1. In practice, the Wi-Fi system 100 is allowed to have more than two wireless communication devices, including an AP MLD and more than one non-AP MLD in the same basic service set (BSS). By way of example, but not limitation, the non-AP MLD 102 and the AP MLD 104 may be in compliance with IEEE 802.11be standard.

In this embodiment, the AP MLD 104 may own M links $L_1$-$L_M$, and may communicate with the non-AP MLD 102 via N links $L_1$-$L_N$, where M and N are positive integers, N is not smaller than 2, and M is not smaller than N. Regarding the non-AP MLD 102, it may include a control circuit 112 and a network interface circuit 114, where the network interface circuit 114 may include a plurality of transceivers (labeled by "TX/RX") 116_1-116_N coupled to a plurality of antennas 118_1-118_N, respectively. Each of the transceivers 116_1-116_N may be a part of one non-AP STA affiliated to the non-AP MLD 102. Regarding the AP MLD 104, it may include a control circuit 122 and a network interface circuit 124, where the network interface circuit 124 may include a plurality of transceivers (labeled by "TX/RX") 126_1-126_M coupled to a plurality of antennas 128_1-128_M, respectively, where M≥N. Each of the transceivers 126 1-126 M may be a part of an AP affiliated to the AP MLD 104. It should be noted that only the components pertinent to the present invention are illustrated in FIG. 1. In practice, the non-AP MLD 102 may include additional components to achieve designated functions, and the AP MLD 104 may include additional components to achieve designated functions. The transceivers 116_1-116_N of the non-AP MLD 102 can communicate with the transceivers 126_1-126_M of the AP MLD 104 via links $L_1$-$L_N$(N≥1) set up between non-AP MLD 102 and AP MLD 104. For example, the links $L_1$-$L_N$ may be channels at different radio-frequency (RF) bands, including 2.4 GHz band, 5 GHz band and/or 6 GHz band. The control circuit 112 at the non-AP MLD 102 and the control circuit 122 at the AP MLD 104 are arranged to control wireless communications between AP MLD 104 and non-AP MLD 102. For example, the control circuit 112 controls an STA-side transmit (TX) circuit to deal with uplink (UL) traffic between AP and non-AP STA, and controls an STA-side receive (RX) circuit to deal with downlink (DL) traffic between AP and non-AP STA, and the control circuit 122 controls an AP-side RX circuit to deal with DL traffic between AP and non-AP STA, and controls an AP-side TX circuit to deal with UL traffic between AP and non-AP STA.

Figure 8:
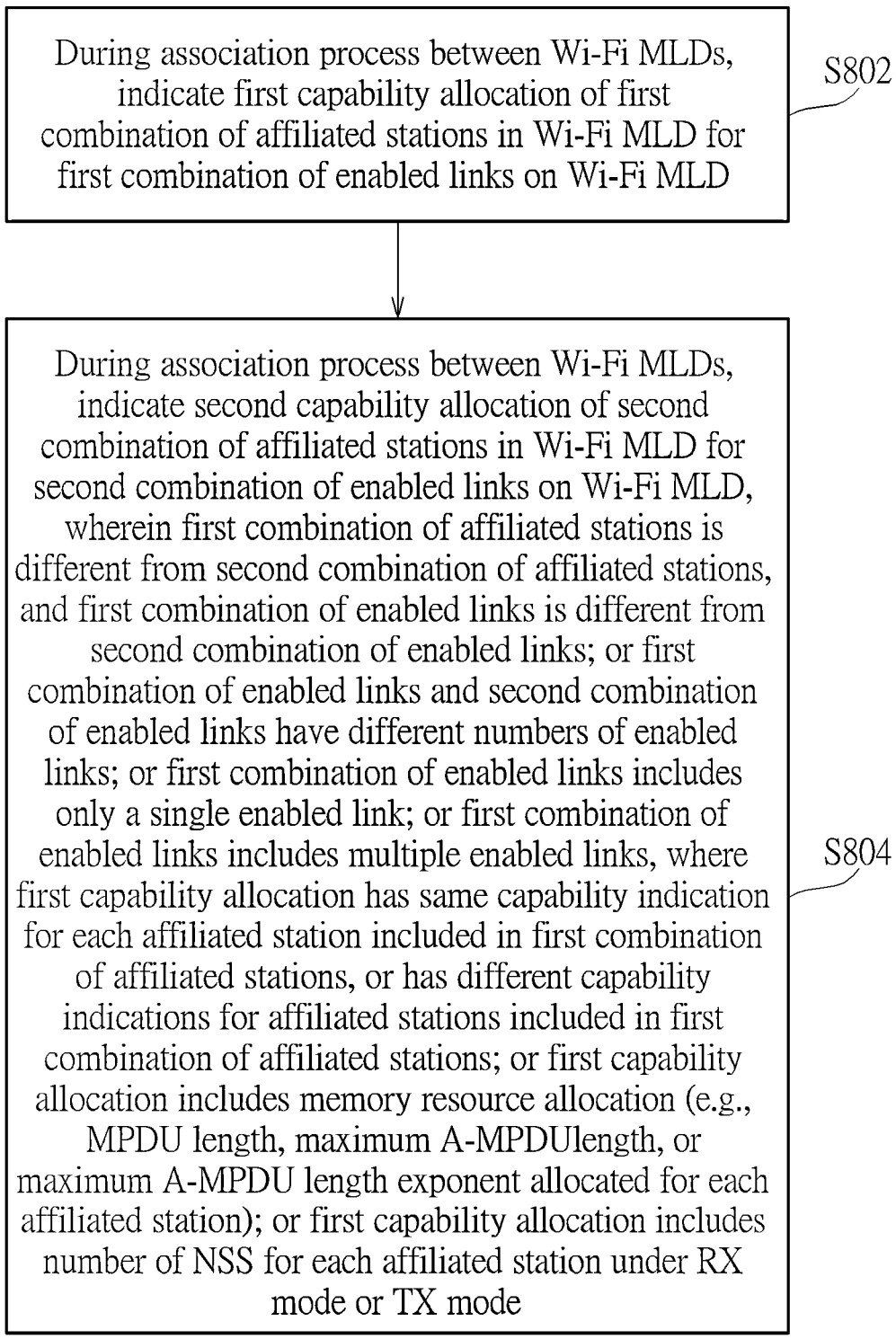
FIG. 8 is a flowchart illustrating a capability indication method employed by a Wi-Fi MLD (e.g., non-AP MLD) shown in FIG. 1 according to an embodiment of the present invention.

Regarding the proposed capability indication scheme, the control circuit 112 of the non-AP MLD 102 is arranged to deal with an association process between non-AP MLD 102 and AP MLD 104 through the network interface circuit 114, wherein during the association process, the control circuit 112 indicates a first capability allocation of a first combination of affiliated stations (i.e. non-AP STAs) for a first combination of enabled links on the non-AP MLD 102 (Step S802 of FIG. 8). and further indicates a second capability allocation of a second combination of affiliated stations (i.e. non-AP STAs) for a second combination of enabled links on the non-AP MLD 102 (Step S804 of FIG. 8). It should be noted that one combination of affiliated stations may include only a single non-AP STA or multiple non-AP STAs, one combination of enabled links may include only a single enabled link or multiple enabled links, the first combination of affiliated stations is different from the second combination of affiliated stations, and the first combination of enabled links is different from the second combination of enabled links. For example, the first combination of affiliated stations and the second combination of affiliated stations may have different numbers of stations (i.e. non-AP STAs) in the non-AP MLD 102, and the first combination of enabled links and the second combination of enabled links may have different numbers of enabled links. Hence, during the association process between non-AP MLD 102 and AP MLD 104, capabilities of different non-AP STA combinations corresponding to different enabled link combinations supported by the non-AP MLD 102 are signaled to the AP MLD 104. Since the number of enabled links on the non-AP MLD 102 may be dynamically changed, the AP MLD 104 can utilize these capabilities of different non-AP STA combinations (which are all announced by non-AP MLD 102 during the association process) to maximize the channel utilization or throughput to the non-AP MLD 102. Further details of the proposed capability indication scheme are described as below with reference to the accompanying drawings.

When communicating with AP MLD 104 via enabled links, non-AP STAs affiliated to the non-AP MLD 102 can share hardware resources of the non-AP MLD 102. Taking a memory as an example of the shared resource, there exists a maximum memory bound to support frame exchange. However, due to cost, it is not always possible to allocate each link with a memory size matching the maximum memory bound. Hence, in some embodiments of the present invention, capability allocation of non-AP STA(s) for one combination of enabled links (e.g. capability allocation of non-AP STA(s) for a specific number of enabled links) that is indicated during the association process may include a memory resource allocation. For example, the memory resource allocation may include a maximum media access control (MAC) protocol data unit (MPDU) length for each non-AP STA. The maximum MPDU length in the very high throughput (VHT)/high efficiency (HE) capabilities element has defined 3 possible values. Specifically, a value of a 2-bit maximum MPDU length subfield is set to 0 for 3895 (4K) octets, set to 1 for 7991 (8K) octets, and set to 2 for 11454 (11K) octets.

In a first scenario, it is assumed that the non-AP MLD 102 is a 3-link capable non-AP MLD with a 24K memory 202 and three stations being non-AP STAs (labeled by STA1, STA2, and STA3), and the non-AP MLD 102 may indicate its maximum MPDU length capabilities of non-AP STA(s) as 1 enabled link, 11K
   2 enabled links, 11K on each link
   3 enabled links, 8K on each link.

Figure 2:
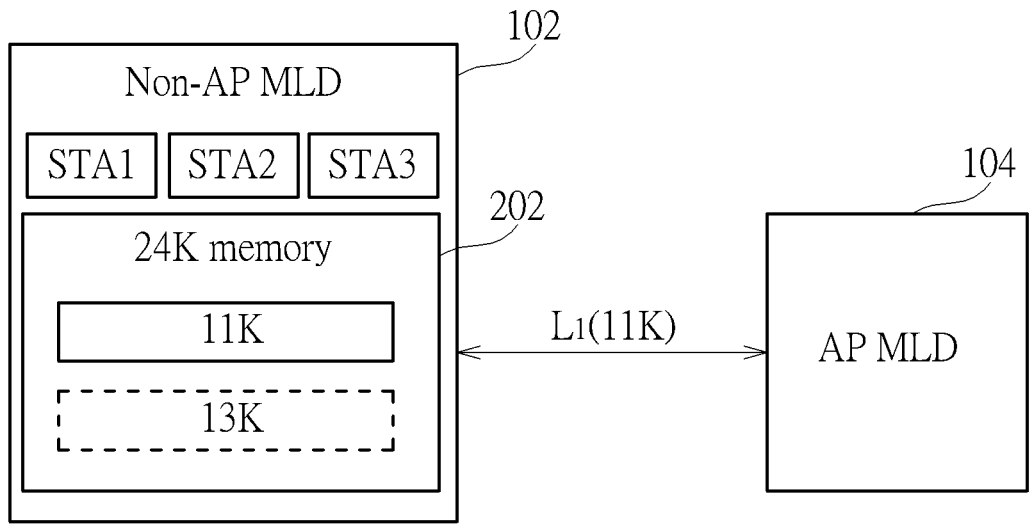
FIG. 2 is a diagram illustrating a case where one link is enabled between a non-AP MLD and an AP MLD according to an embodiment of the present invention.

FIG. 2 is a diagram illustrating a case where one link is enabled between the non-AP MLD 102 (e.g. 3-link capable non-AP MLD with 24K memory 202) and the AP MLD 104 according to an embodiment of the present invention. When the number of enabled links on the non-AP MLD 102 is dynamically changed to 1, the AP MLD 104 can refer to information derived from capability signaling of non-AP MLD 102 to know that the maximum MPDU length capability for one non-AP station (e.g. STA1) using the single enabled link (e.g. $L_1$) is 11454 (11K) octets, and can properly allocate resources for dealing with communications via the single enabled link. For example, based on the capability signaled from the non-AP MLD 102, an AP of the AP MLD 104 may send a packet with an MPDU length constrained by the maximum MPDU length=11454 (11K) octets to the non-AP station STA1 via the enabled link $L_1$ (i.e. the MPDU length of the packet is equal to or smaller than the maximum MPDU length=11454 (11K) octets if the AP MLD 104 sends the packet).

Figure 3:
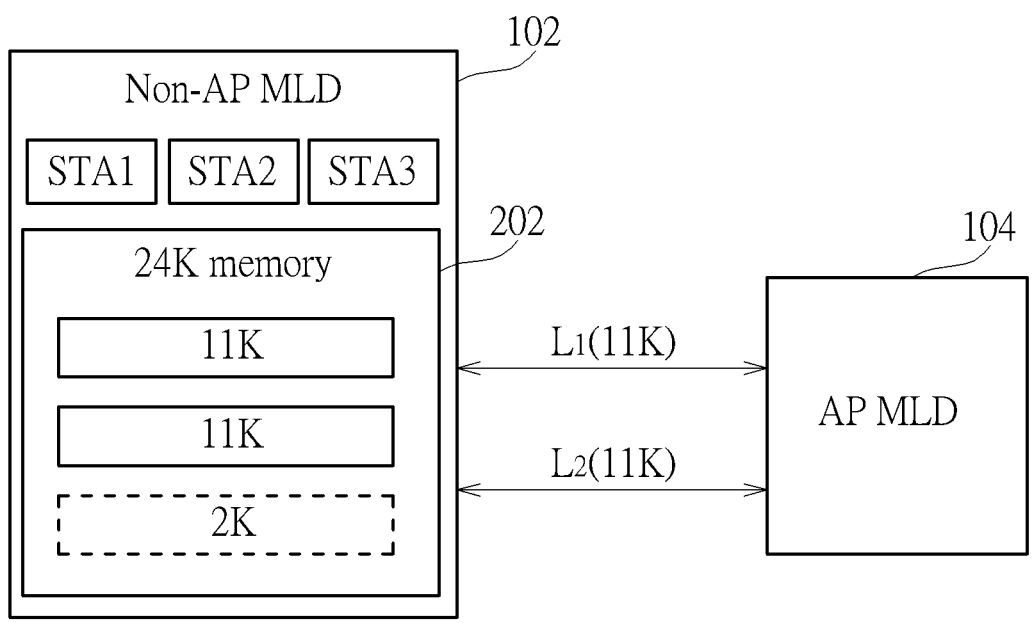
FIG. 3 is a diagram illustrating a case where two links are enabled between a non-AP MLD and an AP MLD according to an embodiment of the present invention.

FIG. 3 is a diagram illustrating a case where two links are enabled between the non-AP MLD 102 (e.g. 3-link capable non-AP MLD with 24K memory 202) and the AP MLD 104 according to an embodiment of the present invention. When the number of enabled links on the non-AP MLD 102 is dynamically changed to 2, the AP MLD 104 can refer to information derived from capability signaling of non-AP MLD 102 to know that the maximum MPDU length capability for each of two non-AP stations (e.g. STA1 and STA2) using the two enabled links (e.g. $L_1$ and $L_2$) is 11454 (11K) octets, and can properly allocate resources for dealing with communications via the two enabled links. For example, based on the capability signaled from the non-AP MLD 102, one AP of the AP MLD 104 may send a packet with an MPDU length constrained by the maximum MPDU length=11454 (11K) octets to the non-AP station STA1 via the enabled link $L_1$, and another AP of the AP MLD 104 may send a packet with an MPDU length constrained by the maximum MPDU length=11454 (11K) octets to the non-AP station STA2 via the enabled link $L_2$.

Figure 4:
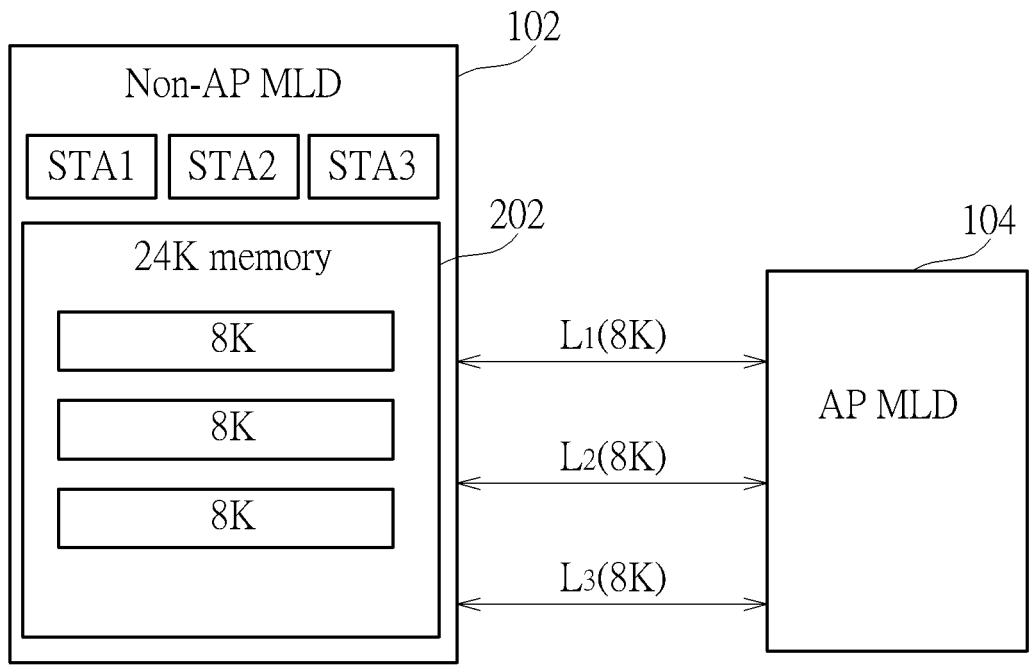
FIG. 4 is a diagram illustrating a case where three links are enabled between a non-AP MLD and an AP MLD according to an embodiment of the present invention.

FIG. 4 is a diagram illustrating a case where three links are enabled between the non-AP MLD 102 (e.g. 3-link capable non-AP MLD with 24K memory 202) and the AP MLD 104 according to an embodiment of the present invention. When the number of enabled links on the non-AP MLD 102 is dynamically changed to 3, the AP MLD 104 can refer to information derived from capability signaling of non-AP MLD 102 to know that the maximum MPDU length capability for each of the three non-AP stations (e.g. STA1-STA3) using the three enabled links (e.g. $L_1$, $L_2$, and $L_3$) is 7991 (8K) octets, and can properly allocate resources for dealing with communications via the three enabled links. For example, based on the capability signaled from the non-AP MLD 102, one AP of the AP MLD 104 may send a packet with an MPDU length constrained by the maximum MPDU length=7991 (8K) octets to the non-AP station STA1 via the enabled link $L_1$, another AP of the AP MLD 104 may send a packet with an MPDU length constrained by the maximum MPDU length=7991 (8K) octets to the non-AP station STA2 via the enabled link $L_2$, and yet another AP of the AP MLD 104 may send a packet with an MPDU length constrained by the maximum MPDU length=7991 (8K) octets to the non-AP station STA3 via the enabled link $L_3$.

Regarding the multi-enabled-link cases shown in FIG. 3 and FIG. 4, the non-AP STAs share the same capability (e.g. maximum MPDU length =11454 (11K) octets or maximum MPDU length=7991 (8K) octets). In other words, the capability allocation of multiple non-AP STAs for an enabled link combination with multiple enabled links that is indicated by the non-AP MLD 102 (particularly, control circuit 112 of non-AP MLD 102) during the association process has the same capability indication for each of the multiple non-AP STAs. However, this is for illustrative purposes only, and is not meant to be a limitation of the present invention. In an alternative design, the capability allocation of multiple non-AP STAs for an enabled link combination with multiple enabled links that is indicated by the non-AP MLD 102 (particularly, control circuit 112 of non-AP MLD 102) during the association process may have different capability indications for non-AP STAs included in the multiple non-AP STAs.

In a second scenario, it is assumed that the non-AP MLD 102 is a 3-link capable non-AP MLD with a 27K memory 502 and three stations being non-AP STAs (labeled by STA1, STA2, and STA3), and the non-AP MLD 102 may indicate its maximum MPDU length capabilities of non-AP STA(s) as
    1 enabled link, 11K
    2 enabled links, 11K on each link
    3 enabled links, (8K, 8K, 11K) corresponding to links (2.4 GHz, 5 GHz, 6 GHz).

Figure 5:
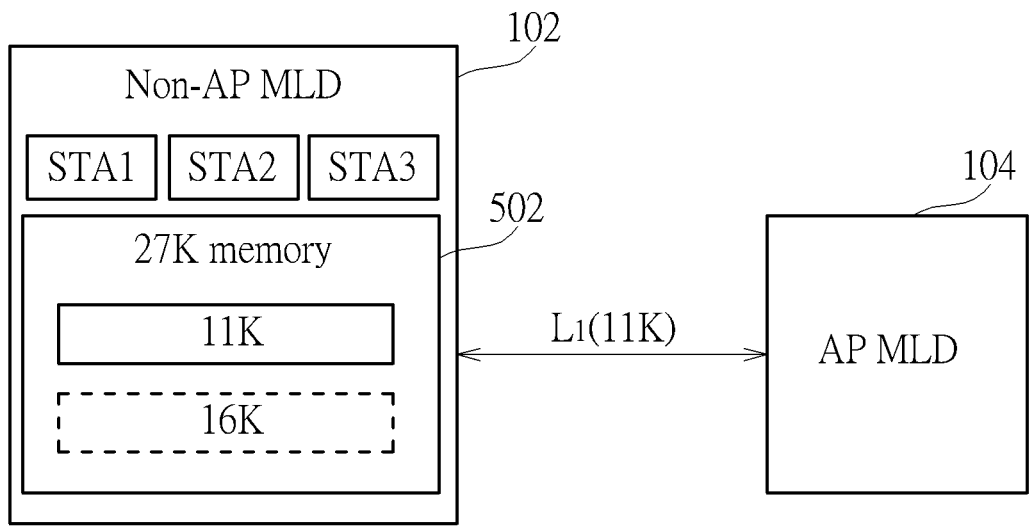
FIG. 5 is a diagram illustrating another case where one link is enabled between a non-AP MLD and an AP MLD according to an embodiment of the present invention.

FIG. 5 is a diagram illustrating another case where one link is enabled between the non-AP MLD 102 (e.g. 3-link capable non-AP MLD with 27K memory 502) and the AP MLD 104 according to an embodiment of the present invention. When the number of enabled links on the non-AP MLD 102 is dynamically changed to 1, the AP MLD 104 can refer to information derived from capability signaling of non-AP MLD 102 to know that the maximum MPDU length capability for one non-AP station (e.g. STA1) using the single enabled link (e.g. $L_1$) is 11454 (11K) octets, and can properly allocate resources for communications via the single enabled link. For example, based on the capability signaled from the non-AP MLD 102, one AP of the AP MLD 104 may send a packet with an MPDU length constrained by the maximum MPDU length =11454 (11K) octets to the non-AP station STA1 via the enabled link $L_1$.

Figure 6:
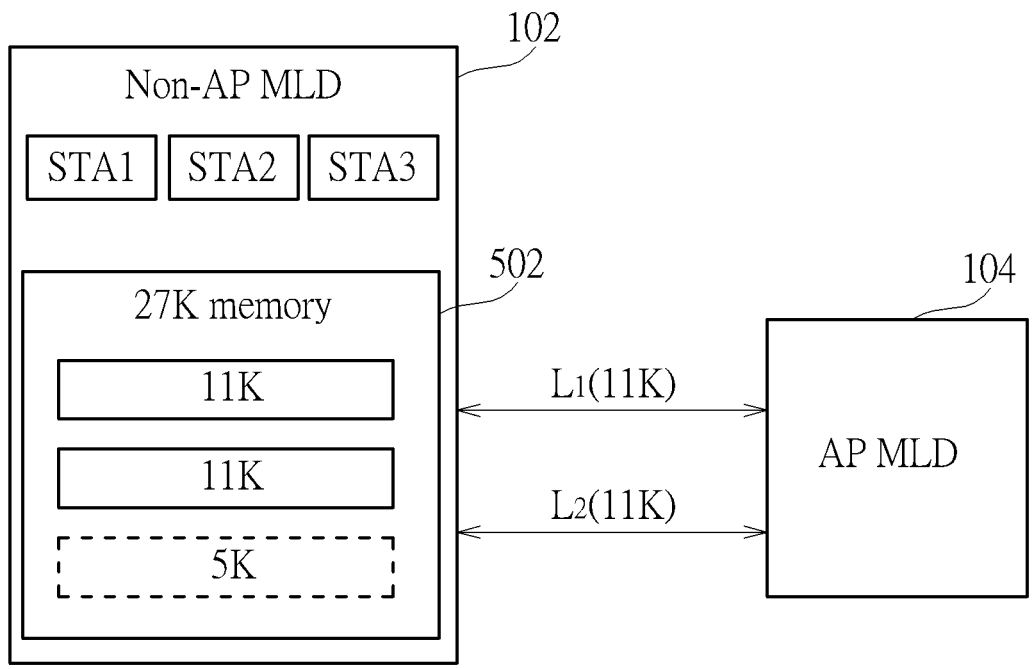
FIG. 6 is a diagram illustrating another case where two links are enabled between a non-AP MLD and an AP MLD according to an embodiment of the present invention.

FIG. 6 is a diagram illustrating another case where two links are enabled between the non-AP MLD 102 (e.g. 3-link capable non-AP MLD with 27K memory 502) and the AP MLD 104 according to an embodiment of the present invention. When the number of enabled links on the non-AP MLD 102 is dynamically changed to 2, the AP MLD 104 can refer to information derived from capability signaling of non-AP MLD 102 to know that the maximum MPDU length capability for each of two non-AP stations (e.g. STA1 and STA2) using the two enabled links (e.g. $L_1$ and $L_2$) is 11454 (11K) octets, and can properly allocate resources for communications via the two enabled links. For example, based on the capability signaled from the non-AP MLD 102, one AP of the AP MLD 104 may send a packet with an MPDU length constrained by the maximum MPDU length=11454 (11K) octets to the non-AP station STA1 via the enabled link $L_1$, and another AP of the AP MLD 104 may send a packet with an MPDU length constrained by the maximum MPDU length =11454 (11K) octets to the non-AP station STA2 via the enabled link $L_2$.

Figure 7:
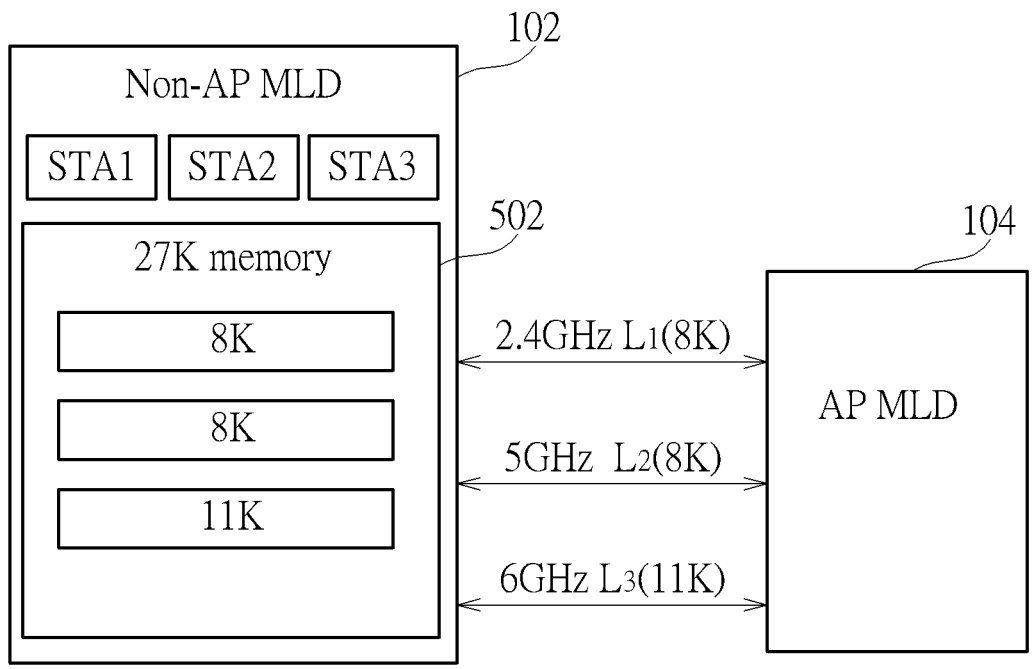
FIG. 7 is a diagram illustrating another case where three links are enabled between a non-AP MLD and an AP MLD according to an embodiment of the present invention.

FIG. 7 is a diagram illustrating another case where three links are enabled between the non-AP MLD 102 (e.g. 3-link capable non-AP MLD with 27K memory 502) and the AP MLD 104 according to an embodiment of the present invention. When the number of enabled links on the non-AP MLD 102 is dynamically changed to 3, the AP MLD 104 can refer to information derived from capability signaling of non-AP MLD 102 to know that the maximum MPDU length capabilities for three non-AP stations (e.g. STA1-STA3) using the three enabled links (e.g. $L_1$@2.4 GHz, $L_2$@5 GHz, and $L_3$@6 GHz) are 7991 (8K) octets, 7991 (8K) octets, and 11454 (11K) octets, respectively, and can properly allocate resources for communications via the three enabled links. For example, based on the capability signaled from the non-AP MLD 102, one AP of the AP MLD 104 may send a packet with an MPDU length constrained by the maximum MPDU length=7991 (8K) octets to the non-AP station STA1 via the enabled link $L_1$, another AP of the AP MLD 104 may send a packet with an MPDU length constrained by the maximum MPDU length=7991 (8K) octets to the non-AP station STA2 via the enabled link $L_2$, and yet another AP of the AP MLD 104 may send a packet with an MPDU length constrained by the maximum MPDU length=11454 (11K) octets to the non-AP station STA3 via the enabled link $L_3$.

In above examples, the memory resource allocation indicated by the non-AP MLD 102 during the association process may include a maximum MPDU length for each non-AP STA. However, this is for illustrative purposes only, and is not meant to be a limitation of the present invention.

In some embodiments of the present invention, the memory resource allocation indicated by the non-AP MLD 102 during the association process may include a maximum aggregate MPDU (A-MPDU) length for each non-AP STA. The maximum A-MPDU length in the high throughput (HT) capabilities element defines 2 possible values. Specifically, a value of a 1-bit maximum A-MPDU length subfield is set to 0 for 3839 octets, and set to 1 for 7935 octets.

In some embodiments of the present invention, the memory resource allocation indicated by the non-AP MLD 102 during the association process may include a maximum A-MPDU length exponent for each non-AP STA. The maximum A-MPDU length exponent in VHT/HE 6 G capabilities element defines the maximum length of an A-MPDU to be $$2^{(13+Maximum\ A-MPDU\ Length\ Exponent)} - 1$$

octets.

As mentioned above, during the association process between non-AP MLD 102 and AP MLD 104, the control circuit 112 indicates capability allocations of different non-AP STA combinations for different enabled link combinations (or different numbers of enabled links) supported by the non-AP MLD 102. In addition to the memory resource allocation, other capabilities or operation modes may be announced by the non-AP MLD 102 (particularly, control circuit 112 of non-AP MLD 102) during the association process between non-AP MLD 102 and AP MLD 104.

For example, capability allocation of one combination of non-AP STAs for one combination of enabled links (e.g. capability allocation of non-AP STA(s) for a particular number of enabled links) that is indicated during the association process may include the number of spatial streams (NSS) for each non-AP STA under an RX mode. Regarding a multi-enabled-link case, the non-AP STAs using these enabled links may share the same RX NSS capability or may have different RX NSS capabilities, depending upon actual design considerations.

For another example, capability allocation of one combination of non-AP STAs for one combination of enabled links (e.g. capability allocation of non-AP STAs for a particular number of enabled links) that is indicated during the association process may include the number of spatial streams (NSS) for each non-AP STA under a TX mode. Regarding a multi-enabled-link case, the non-AP STAs using these enabled links may share the same TX NSS capability or may have different TX NSS capabilities, depending upon actual design considerations.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A capability indication method employed by a Wi-Fi multi-link device (MLD), comprising:
    during an association process between the Wi-Fi MLD and another Wi-Fi MLD, indicating a first capability allocation of a first combination of affiliated stations in the Wi-Fi MLD for a first combination of enabled links on the Wi-Fi MLD, and indicating a second capability allocation of a second combination of affiliated stations in the Wi-Fi MLD for a second combination of enabled links on the Wi-Fi MLD;
    wherein the first combination of affiliated stations is different from the second combination of affiliated stations, and the first combination of enabled links is different from the second combination of enabled links.

2. The capability indication method of claim 1, wherein the first combination of enabled links and the second combination of enabled links have different numbers of enabled links.

3. The capability indication method of claim 1, wherein the first combination of enabled links includes only a single enabled link.

4. The capability indication method of claim 1, wherein the first combination of enabled links includes multiple enabled links.

5. The capability indication method of claim 4, wherein the first capability allocation has a same capability indication for each affiliated station included in the first combination of affiliated stations.

6. The capability indication method of claim 4, wherein the first capability allocation has different capability indications for affiliated stations included in the first combination of affiliated stations.

7. The capability indication method of claim 1, wherein the first capability allocation comprises a memory resource allocation.

8. The capability indication method of claim 7, wherein the memory resource allocation comprises a maximum media access control (MAC) protocol data unit (MPDU) length for each affiliated station, a maximum aggregate MPDU (A-MPDU) length for each affiliated station, or a maximum A-MPDU length exponent allocated for each affiliated station.

9. The capability indication method of claim 1, wherein the first capability allocation comprises a number of spatial streams (NSS) for each affiliated station under a receive (RX) mode.

10. The capability indication method of claim 1, wherein the first capability allocation comprises a number of spatial streams (NSS) for each affiliated station under a transmit (TX) mode.

11. A Wi-Fi multi-link device (MLD) comprising:
    a network interface circuit; and
    a control circuit, arranged to communicate with another Wi-Fi MLD through the network interface circuit, wherein during association between the Wi-Fi MLD and the another Wi-Fi MLD, the control circuit is arranged to indicate a first capability allocation of a first combination of affiliated stations in the Wi-Fi MLD for a first combination of enabled links on the Wi-Fi MLD, and is further arranged to indicate a second capability allocation of a second combination of affiliated stations in the Wi-Fi MLD for a second combination of enabled links on the Wi-Fi MLD, where the first combination of affiliated stations is different from the second combination of affiliated stations, and the first combination of enabled links is different from the second combination of enabled links.

12. The Wi-Fi MLD of claim 11, wherein the first combination of enabled links and the second combination of enabled links have different numbers of enabled links.

13. The Wi-Fi MLD of claim 11, wherein the first combination of enabled links includes only a single enabled link.

14. The Wi-Fi MLD of claim 11, wherein the first combination of enabled links includes multiple enabled links.

15. The Wi-Fi MLD of claim 14, wherein the first capability allocation has a same capability indication for each affiliated station included in the first combination of affiliated stations.

16. The Wi-Fi MLD of claim 14, wherein the first capability allocation has different capability indications for affiliated stations included in the first combination of affiliated stations.

17. The Wi-Fi MLD of claim 11, wherein the first capability allocation comprises a memory resource allocation.

18. The Wi-Fi MLD of claim 17, wherein the memory resource allocation comprises a maximum media access control (MAC) protocol data unit (MPDU) for each affiliated station, a maximum aggregate MPDU (A-MPDU) length for each affiliated station, or a maximum A-MPDU length exponent for each affiliated station.

19. The Wi-Fi MLD of claim 11, wherein the first capability allocation comprises a number of spatial streams (NSS) for each affiliated station under a receive (RX) mode.

20. The Wi-Fi MLD of claim 11, wherein the first capability allocation comprises a number of spatial streams (NSS) for each affiliated station under a transmit (TX) mode.

* * * * *